Patented Oct. 2, 1928.

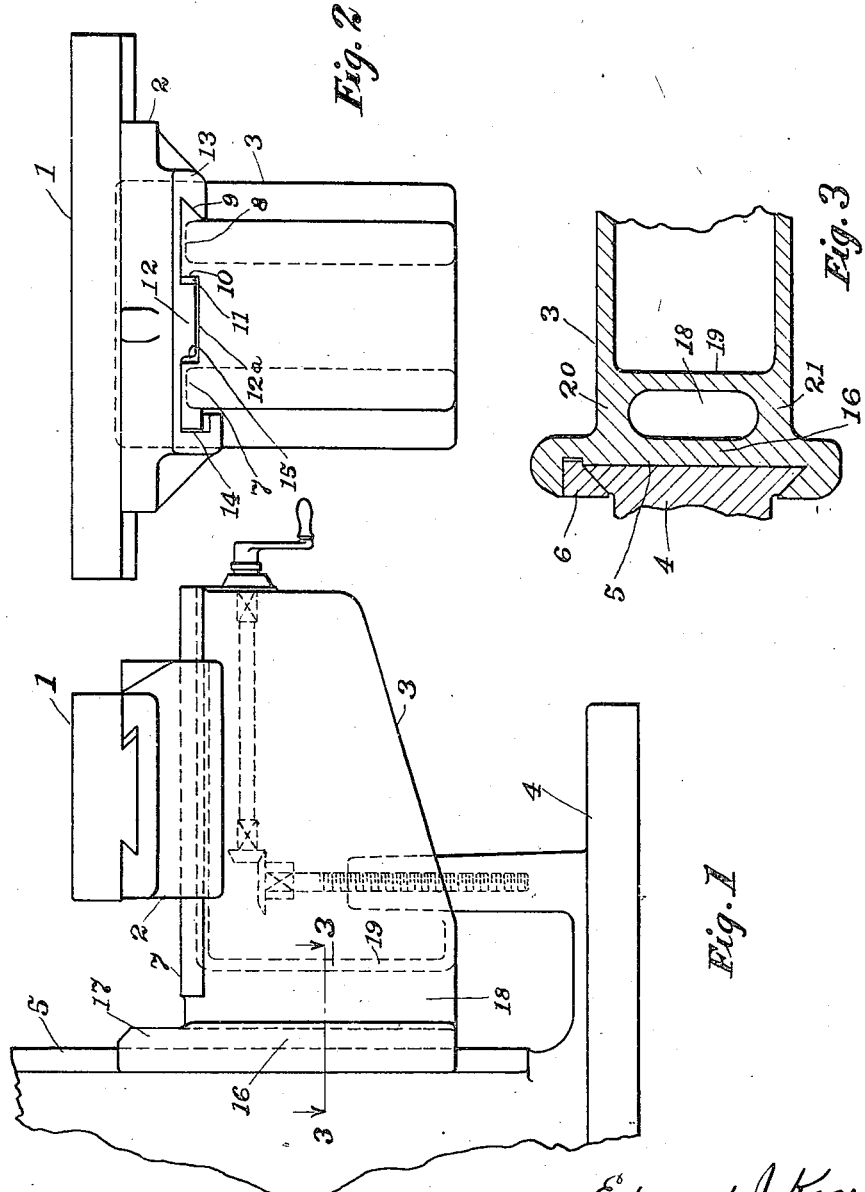
Oct. 2, 1928.
E. J. KEARNEY
1,685,920
MACHINE TOOL KNEE STRUCTURE
Filed Dec. 15, 1923
Edward J Kearney
INVENTOR.
BY Fred G Parsons
ATTORNEY.

1,685,920

UNITED STATES PATENT OFFICE.

EDWARD J. KEARNEY, OF WAUWATOSA, WISCONSIN, ASSIGNOR TO KEARNEY & TRECKER CORPORATION, OF WEST ALLIS, WISCONSIN, A CORPORATION OF WISCONSIN.

MACHINE-TOOL KNEE STRUCTURE.

Application filed December 15, 1923. Serial No. 681,010.

This invention relates to improvements in a machine tool knee structure, and with particular reference to knee structures such as the knee of the machine ordinarily known as a knee type milling machine.

To fully explain the advantages of my invention, I shall briefly describe the ordinary machine structure as used on various well-known knee types of milling machines. In these machines, a column provides a stationary support for both the work and the tool. The tool is ordinarily rotatable but otherwise fixed in its relation to the supporting column, while the work is ordinarily provided with three movements relative to the tool and column including a vertical movement: a cross, or in and out movement, and a longitudinal or right and left movement. The work is ordinarily supported upon a table or platen, which is supported by and guided in a suitable slideway in an underlying saddle, thus providing for the longitudinal movement of the work. The saddle is in turn slidably supported upon and guided by the knee, thus providing the cross, or in and out movement, while the knee is slidably supported upon and guided by the column, thus providing the vertical movement.

The slideway providing relative movement between knee and saddle, must ordinarily be relatively limited in length as any considerable length in the direction of this slideway, or outwardly from the column face, interferes with the machine operator in his position for most convenient general operation of the machine. This necessitates a comparatively short saddle in the direction of this slideway, since the saddle must be still shorter than the knee in this direction by an amount approximating the total cross, or in and out work movement. The slideway must nevertheless be relatively broad in order to properly resist the forces set up by the rotating cutter, which act largely in a direction transverse to the length of the slideway.

Generally speaking, a relatively broad and short guide does not provide a good construction for machine tool slides, and it is therefore customary to retain the breadth of the support but decrease the width of guide, this being accomplished ordinarily by means including a depression or groove in the center of the slideway on the top of the knee, and extending the full length of the slideway.

Such a depression, while necessary, to produce the so-called "narrow guide" becomes a lodging place for some of the metal chips formed while operating upon the work, the depression being almost directly underneath the cutter, and such chips are difficult or inconvenient to remove from the depression, especially from that portion of the slideway situated between the saddle and the column face. If allowed to remain in this portion, they become a source of annoyance and possible damage to the machine when it is attempted to move the saddle from the one of its outward positions of adjustment to an inward position close to the face of the column.

One of the main objects of this invention is to avoid the inconvenience and possible machine damage from chips accumulating as described in that portion of the depression in the top of the knee situated between the saddle and the column face.

Another purpose is to provide a channel whereby cutter cooling fluid may return from the cutter to the base of the machine without flowing over exterior portions of the knee.

Another object is to improve the knee structure and to add to the convenience of operation and utility of a milling machine of the knee type.

The special means by which the above purposes are accomplished will now be described in detail in one of the preferred embodiments, reference being had to the accompanying drawings, in which:

Figure 1 is a partial general view in side elevation of a milling machine of the knee type in which my invention is embodied, but from which many details of the complete machine have been omitted since they are not contemplated as an essential part of my invention, and since this type of machine is well known. In this view only a fragmentary portion of a column 4 is shown, sufficient to show its function as a support for a table 1, saddle 2, and knee 3.

Figure 2 is a general view in front elevation of the table, saddle and knee shown in Figure 1. In this view the column has been omitted.

Figure 3 is a fragmentary cross sectional view taken horizontally thru the knee structure along the lines 3—3 of Figure 1.

The knee 3 slides vertically upon and is guided by a slideway 5 on the face of column 4, adjustment for sliding clearance being provided by the means of a gib 6 of ordinary construction.

A slideway having portions 7 and 8, supports and guides the saddle 2, the portion 8 being both a guide and a support while the portion 7 acts only as a support for resisting downward pressure. The saddle is guided for cross, or in and out movement, by the faces 9 and 10 on the portion 8, while a gib 11 of ordinary construction provides an adjustment for the guiding function.

The gib 11 is retained between the face 10 and a downwardly projecting portion 12 of the saddle 2, the projecting portion 12 acting as a thrust block on the saddle to transfer pressures from the saddle to the knee when the pressures are in the one direction, while the portion 13 of the saddle 2 acts as a similar thrust block on the saddle for pressures in opposite direction, either thrust being transferred to the upwardly projecting knee slideway portion 8; there being clearance provided at 14 and 15 between knee and saddle to prevent side thrusts being taken at other points.

The downwardly projecting portion 12 has clearance provided for its movement in a groove or depression 12$^a$ interlying the two slide portions 7 and 8 as shown in Figure 2.

The knee portions 7 and 8 may, from another point of view, be described as portions of a knee top plate in which 12$^a$ is a groove or depression extending substantially the full length thereof.

The table 1 is supported and guided on the saddle 2 by means as illustrated in Figures 1 and 2, but which since they form no part of my invention will not be described in detail.

Means for raising or lowering the knee 3 may be provided in a variety of forms well known in the art, and a simple form of such means is shown in Figure 1. It is obvious that means may likewise be provided as in ordinary practice for a relative cross actuation of the saddle 2 and a relative longitudinal actuation of the table 1, but since such devices form no part of my invention, they are omitted for the sake of clearness.

The knee portion embracing the slide 5 on column 4 is formed in part by a plate 16, a portion 17 of which projects above the slide 7 in order to lengthen the bearing of the knee on the column while maintaining a relatively low relation between the table 1 and the floor upon which column 1 rests.

Directly adjacent to the plate 16 an open passage or channel 18 extends thru the knee 3 from top to bottom, the plate 16 forming the rear wall of the passage.

A rib or plate 19 extending from side to side of the knee 3 forms a front wall for the passage 18, while the side walls of the passage or channel may be formed by the side walls 20 and 21 of the knee, which are materially thickened or strengthened at points adjacent the passage.

The width of the passage or channel 18 should preferably be somewhat greater than the width of the knee depression 12$^a$ and the interior of the passage from top to bottom is preferably without side openings or internal projections.

It will be evident that chips, which would ordinarily in existing machines fall between saddle 2 and the face of column 4, and in large part collect in the rear portion of the groove or depression 12$^a$ between the saddle 2 and the projecting plate portion 17, may mainly fall directly thru the passage or channel 18, and that such chips as do collect in this portion of the depression 12' will be forced backward and fall thru the channel, should the saddle 2 be moved rearwardly.

It will also be evident that the channel 18 may provide a passageway for any fluids used for the cooling of cutter or work.

Having thus described my invention, I claim:

1. A machine tool knee structure comprising a plate forming portions of a slideway adapted to guide said structure for vertical movements, a plurality of walls fixed with said plate and extending therefrom in planes substantially vertical to the plane of said plate, and a rib extending from the one to the other of said walls and lying in a plane parallel to the plane of said plate, said plate, walls, and rib forming a passage thru said structure adjacent said slideway and having open ends.

2. A machine tool knee structure having a slideway adapted to guide the structure for vertical movement, a plurality of side walls fixed with said slideway and extending in vertical planes, a channel thru said structure and having open ends, and a rib extending between said side walls to laterally strengthen both said walls and forming a closure for one side of said channel.

3. A machine tool knee structure, including vertical structure walls and having a slideway for guiding the structure for vertical movements, and a vertical passage thru said structure and freely open at both ends adjacent said slideway and having vertical side walls; portions of said passage walls being formed by thickened portions of said structure walls.

4. A machine tool knee structure comprising a slideway adapted to guide the structure for vertical movements, a top plate forming a slideway adapted to guide a saddle for horizontal movements, a groove in said top plate extending substantially throughout the length thereof and leading at the one end into an opening in said top plate, and a vertical passage thru said structure; said opening forming the one end of said passage.

5. In a machine tool the combination of a base portion and a knee vertically movable on an upward extension of said base portion; said knee comprising a vertical rear plate forming portions of a slideway adapted to guide said knee for vertical movement, a horizontal top plate having side edge surfaces adapted to guide another member for horizontal movement, vertical side walls spaced apart and a bottom wall, said knee having an unrestricted vertical passageway adjacent said rear plate, the upper opening of which lies between said side edge surfaces.

EDWARD J. KEARNEY.